United States Patent Office 3,388,946
Patented June 18, 1968

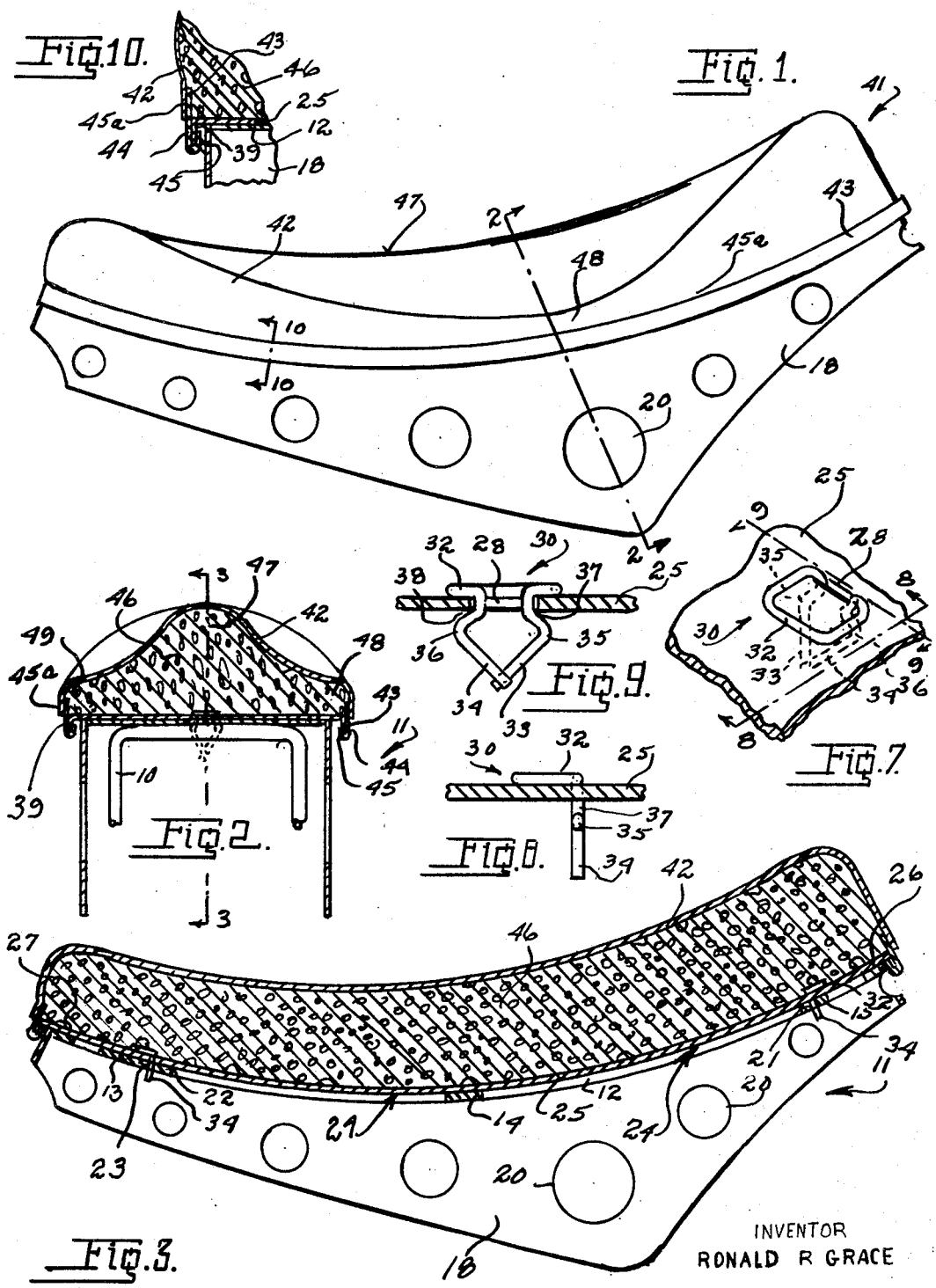

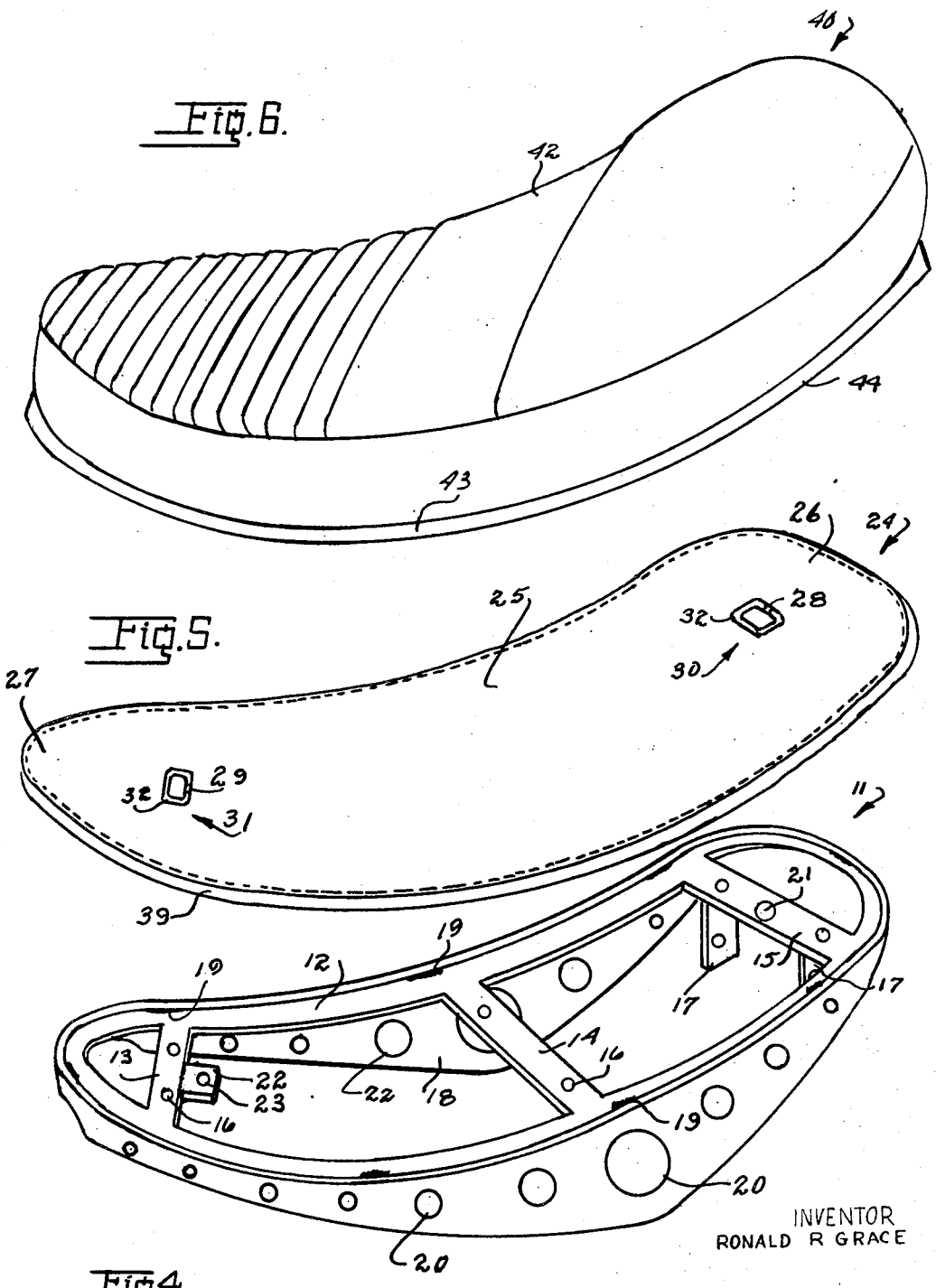

3,388,946
MOTORCYCLE SEAT
Ronald R. Grace, 633 High St.,
Hamilton, Ohio 45011
Filed Sept. 8, 1966, Ser. No. 577,942
9 Claims. (Cl. 297—214)

ABSTRACT OF THE DISCLOSURE

The cycle (motorcycle) seat of the present invention essentially requires a pair of plates one of which is substantially permanently connected to the cycle frame while the other plate is relatively permanently secured to the seat, per se, and which plates have means for connecting the seat and cycle to one another for normal use.

As illustrated in the drawings and the following specification the said connecting means may readily take the form of spring means carried by the seat plate for engagement with the cycle plate in securing, even though removably, the seat to the cycle.

Summary of the invention

This invention relates to improvements in motorcycle seats.

While the invention, as indicated above, will find its principal use in motorcycles of the two wheel variety, it is to be understood that the invention has equal application to manual or foot pedaled cycles, generally called bicycles, as well as tricycles or any other device in which a seat is employed that is to be straddled.

The principal object of this invention is the provision of a motorcycle seat that can readily be mounted on and removed from a motor cycle frame which is provided with a seat frame through which the seat, itself, is attached to the cycle frame.

Another object of this invention is the provision of means whereby any one of several seats may be used with the same motorcycle seat frame, such as a dual seat, or a solo seat.

A still further and specific object of the present invention comprises a seat frame secured to a motorcycle frame and to which seat frame a motorcycle seat may be readily attached through a suitable plate adapted to have different seats, per se, or seat cushions, removably secured thereto, or which seats, per se, or separate seat cushions, each has secured to it an attaching seat plate.

Other objects and advantages of the present invention should be readily apparent by reference to the following specification considered in conjunction with the accompanying drawings, forming a part thereof, and it is to be understood that any modifications may be made in the exact structural details there shown and described, within the scope of the appended claims, without departing from or exceeding the spirit of the invention.

In the drawings:

FIG. 1 is a side elevational view of a motorcycle seat including the principles of the present invention.

FIG. 2 is a transverse, sectional view through the seat of FIG. 1 and its mounting means, as seen from line 2—2 on FIG. 1.

FIG. 3 is a longitudinal, sectional view through the assembled seat off the present invention, as seen from line 3—3 on FIG. 2.

FIG. 4 is a perspective view of a seat frame, adapted for use with a motorcycle frame and which seat frame constitutes an element of the invention.

FIG. 5 is a perspective view of a seat plate adapted for cooperation with the seat frame of FIG. 4 for readily mounting and demounting the said seat plate on said seat frame.

FIG. 6 is a view of a seat or cushion adapter to be secured to the seat frame of FIG. 4 through the seat plate of FIG. 5; the said seat, per se, or cushion, is different in this figure of the drawings from that shown in FIGS. 1, 2 and 3.

FIG. 7 is an enlarged perspective view of the attaching means or clip, disposed in this application, as one form to readily, securely, yet detachably, secure the seat plate to the seat frame.

FIG. 8 is a side elevational view of said securing means or clip, as seen from line 8—8 on FIG. 7.

FIG. 9 is a front elevational view of said securing means or clip at right angles to FIG. 8 as seen from line 9—9 on FIG. 7.

FIG. 10 is an enlarged view of the method and means for securing the seat, per se, to the seat plate as seen from line 10—10 on FIG. 1.

Throughout the several views of the drawings similar reference characters are employed to denote the same or similar parts.

As noted above, this invention pertains to cycle seats, that is, seats as employed on manual or foot operated bicycles, motor or other power operated cycles, generally called motorcycles, and tricycles whether of the manual or foot power operated or motor operated. It is believed that the chief use of the present invention will be with the motor operated cycles, motorcycles. As will subsequently be made clear a motor cycle may be equipped with a dual seat, that is a seat which will accommodate two people, in transporting the same from the home or the like to a racing track or motorcycle exhibition, and in which it is ultimately desirable to have what may be called "solo" seat such as illustrated in FIGS. 1, 2 and 3. In this instance it is only necessary, as will later be made clear, to disengage the dual seat from the seat frame and secure to the said frame the solo seat and the driver of the motorcycle can then indulge in any desirable performance while the companion, that occupied the other portion of the dual seat, may remain as a spectator until the meet, or the like, is over, whereupon, the seats are again interchanged and the parties return to home or wherever desired.

As illustrated in the drawings, particularly FIG. 2, a U-shaped brace or attaching bar 10 is illustrated and which is intended to represent the normal motorcycle frame, otherwise not illustrated in the drawings. The motorcycle frame 10 has secured thereto the seat frame, indicated in its entirety by the reference numeral 11, and illustrated in detail in FIG. 4.

The seat frame 11 comprises a stamping 12 substantially, uniformly thick and slightly curved for comfort of the user as is usual. The frame 12 is, in plan, pierced, or cut away, so as to provide transverse bars 13, 14 and 15 having apertures 16 therein and depending tongues 17 which are the specific means whereby the seat frame plate is secured to the motorcycle frame 10.

A depending skirt 18 formed of a single thickness of material, similar to the plate 12, is secured by welding, or welds, 19, at various places along the outer edge of the seat frame plate 12 and skirt 18 so that these members represent a substantially solid connection with the motorcycle frame 10; it being understood that the usual springs or other cushioning mechanism is employed with the motorcycle frame 10 to absorb shocks and the like inevitable in normal opertion of a wheeled vehicle. The seat frame skirt 18 is provided with a plurality of apertures 20 for lightening the frame, as well as, adding a certain decorative look to the seat frame.

In connection with the seat frame plate 12 the transverse bar 15 at the rear end of the seat frame is provided, substantially centrally thereof, with an aperture 21.

while the cross bar 13, at the forward end of the seat frame plate 12, has welded or otherwise secured thereto a tongue 22 likewise provided with an aperture 23. The apertures 21 and 23, as will presently be made clear, constitute a part of the means for securing the interchangeable seats, per se, to the seat frame.

As illustrated in FIGS. 2 and 3 the seat frame 11 has secured to its upper face a seat plate, indicated, in its entirety, in the drawings by the reference numeral 24. The said seat plate may be pressed or formed from sheet steel or fiber glass and has its body portion 25 of the general plan of the seat frame plate 12 having a relatively broad rear end 26 and a somewhat pointed forward end 27. The seat plate body portion 25 is of a solid construction and is substantially devoid of apertures or openings except that inwardly from the rear end 26 the said plate body portion 25 has an elongated aperture 28 therein. Similarly, inwardly of the front or relatively pointed end 27, the plate body portion 25 is provided with an elongated aperture 29.

Secured to the upper surface of the plate body portion 25 are a pair of attaching members indicated in their entirety, and respectively, by the reference numerals 30 and 31. Each of the attaching members 30 and 31 is substantially identical and each includes a flat loop 32 of spring wire which lies on the upper surface of the said plate body portion 25. Said attaching members 30 and 31 are, respectively, adjacent the opening 28 or 29, in the said seat plate body portion 24 and with said attaching members each having at the ends of its loop 32 downwardly extending spring arms 33 and 34, with said spring arms outwardly bulged at, respectively, 35 and 36 and which bulges are downwardly of ends of loop ends to provide passageways 37 and 38 which underlie the said opposed ends of the respective elongated apertures 28 and 29 and clamp thereby the seat plate 24.

In operation, and as shown in FIGS. 2, 5 and 9 the seat plate 24 is secured to the seat frame 11 by downwardly pressing the said seat plate to force the arms 33 and 34 through the openings 28 and 29 and which spring arms outwardly yieldably extend beneath the said ends of the elongated apertures 28 and 29 and said arms receive in their respective passageways 37 and 38 the portions of the plate 11 immediately outwardly of the openings 28 and 29. When it is desired to remove the said seat plate 24 it is only necessary to reverse the pressure on the said seat plate 24, that is, upwardly lift, with some force, the seat plate 24 through its ends 26 and 27 which will again press the spring arms 33 and 34 toward one another and permit the lifting of the securing arms 33 and 34 through the apertures.

The said seat plate 24 has downwardly projecting from its periphery a flange 39 wherefore the said seat plate 24 has the general transverse cross-section of an inverted dish, as seen in FIG. 2. The said flange 39 is the means whereby the seat, per se, or cushion, is secured to the cycle seat frame plate 24.

As intimated above, several different forms or styles of seats, per se, or cushions, may be employed, that illustrated in FIG. 6, and indicated in its entirety by the reference numeral 40, being a dual seat, that is, a seat for a driver and a passenger riding in tandem to one another; while the seat shown in FIGS. 1, 2 and 3, and indicated in its entirety by the reference numeral 41, is a solo seat, and intended to be occupied exclusively by the motorcycle operator.

Each of the seats illustrated in the drawings is similarly constructed in that it has an outer covering 42 made of leather, vinyl, or some similar tough material, to withstand the use to which it is to be subjected. Secured to the lower edge of the said cover is an attaching member 43 including a pair of arms 44 and 45 which are integral with one another and have a space therebetween adapted to receive the depending flange 37 of the seat plate 24. As illustrated in the drawings the said attaching member 43 has its one arm 44 longer than the other which lies inside of the lower edge 45 of the said cover 42 and it is these overlying members that are secured to one another to provide the means for securing the seat, per se, to the plate 24.

Disposed on the upper surface of the seat plate 24 is a cushion 46 which is preformed of foam rubber, foam plastic, and the like, molded to the most desirable form for the seat and the work to be done thereby. The said molded cushion 46 will in all instances have a plan substantially identical with the plan of the seat plate body portion 25 and will have a vertical dimension and contour, as noted above, depending upon the use to which it is to be put.

The said foam cushion 46 in the tandem seat 40 of FIG. 6 is of a desired thickness and which thickness is substantially uniform from end to end and side to side thereof. On the other hand, the solo seat 41 of FIGS. 1, 2 and 3 is contoured to have a relatively high central ridge longitudinally of the seat as at 47 in FIGS. 1 and 2, and which central portion substantially falls away, or is contoured away, from said high center 47 to comparatively thin longitudinal side edges 48 and 49 while at the same time the front and back ends of the central ridge 47 are of substantially the same height from the seat plate 24 as is the said ridge 47, and as illustrated in cross-section in FIG. 3.

From the foregoing the operation of the present invention is believed to be quite clear since each of the interchangable seats will preferably include a seat plate 24 and a cushion and its cover formed and contoured as necessary for the work to be preformed as set forth above.

Except for the rather strenuous effort necessary the seat cover and cushions may be interchanged on a seat plate 24, but in that instance the advantage and convenience of the interchangable composite seat is lost since all that is necessary to do this is effect an upward jerk on each end of a composite seat through the hands of the user for disengaging the seat on the motorcycle seat frame at that instance, and then grasp the desired seat by the user and position the lower ends of the spring fastening means 30 and 31 relative to the elongated apertures 28 and 29 and a downward push will secure the seat desired to be used to the motorcycle seat frame.

What is claimed is:

1. In a motorcycle seat of the class described the combination with a cycle seat attaching portion of a frame, of a seat frame having the general contour in plan and elevation of a seat secured to said cycle frame seat attaching portion, a seat including an attaching plate, and manually operable means operable independently of the use of tools securing said seat attaching plate to the seat frame.

2. In a motorcycle seat of the class described as set forth in claim 1 characterized by, and the said manually operable means for securing the seat attaching plate and seat frame to one another including spring means.

3. In a motorcycle seat of the class described as set forth in claim 1 characterized by, and the said seat per se, including means for removably securing same to the attaching plate and through which plate the manual securement of the seat and seat frame is effected.

4. In a motorcycle seat of the class described as set forth in claim 1 characterized by, the said seat per se, including means for removably securing same to the attaching plate and through which plate the manual securement of the seat and seat frame is effected, and the said manually operable means for securing the seat and seat frame to one another including spring means.

5. In a motorcycle seat of the class described as set forth in claim 1 characterized by, the means for the securing of the seat attaching plate to the seat frame including said seat attaching plate and seat frame plate having substantially identical area and contour and through which plates the attachment of the seat and seat frame is effected.

6. In a motorcycle seat of the class described as set forth in claim 1 characterized by, the means for the securing of the seat attaching plate to the seat frame including said seat attaching plate and seat frame plate having substantially identical area and contour and through which plates the attachment of the seat and seat frame is effected, and said manually operable securing means further inclduing one of said seat plate and seat frame plate having apertures therein, and the other of said seat plate and seat frame plate having readily yieldable means operable by hand power for insertion in the aperture removably securing said seat plate and seat frame plate to one another.

7. In a motorcycle seat of the class described as set forth in claim 1 characterized by, the said seat per se, including means for removably securing same to the attaching plate and through which plate the manual securement of the seat and seat frame is effected, said seat, per se, removable securement including the seat attaching plate of an area and contour substantially equal to the area and contour of the said seat, per se, and with said seat plate having at its peripheral edges a down-turned flange, and said seat, per se, including a cover with a peripheral depending member including a short reverse flange at its free edge forming a groove between the depending member and short reverse flange cooperating with the seat plate flange for securing said seat, per se, and its cover to the seat attaching plate.

8. In a motorcycle seat of the class described as set forth in claim 1 characterized by, the said seat, per se, including means for removably securing same to the attaching plate and through which plate the manual securement of the seat and seat frame is effected, said seat, per se, removable securement including the seat attaching plate of an area and contour substantially equal to the area and contour of the said seat, per se, and with said seat plate having at its peripheral edges a down-turned flange, said seat, per se, including a cover with a peripheral depending member including a short reverse flange at its free edge forming a groove between the depending member and short reverse flange cooperating with the seat plate flange for securing said seat, per se, and its cover to the seat attaching plate, and said manually operable detachable means securing the seat attaching plate and seat frame plate to one another including spring means on one of the seat attaching plate and seat frame plate for releasably engaging the other securing them to one another.

9. In a motorcycle seat of the class described as set forth in claim 1 characterized by the said seat, per se, including means for removably securing same to the attaching plate and through which plate the manual securement of the seat and seat frame is effected, said seat, per se, removable securement including the seat attaching plate of an area and contour substantially equal to the area and contour of the said seat, per se, and with said seat plate having at its peripheral edges a down-turned flange, said seat, per se, including a cover with a peripheral depending member including a short reverse flange at its free edge forming a groove between the depending member and short reverse flange cooperating with the seat plate flange for securing said seat, per se, and its cover to the seat attaching plate, said manually operable detachable means securing the seat attaching plate and seat frame plate to one another including spring means on one of the seat attaching plate and seat frame plate for securing them to one another, and a formed relatively resilient seat cushion on the seat plate and secured in operative position thereto by the seat cover upon securement to the seat plate.

References Cited
UNITED STATES PATENTS

| | | | |
|---|---|---|---|
| 562,965 | 6/1896 | Lester | 297—214 |
| 2,007,994 | 7/1935 | Anderson | 297—214 X |
| 2,057,588 | 10/1936 | Place | 52—511 |
| 2,141,500 | 12/1938 | Woodall | 52—511 |
| 2,197,419 | 4/1940 | Ross | 52—511 |
| 2,341,720 | 2/1944 | Kalter | 297—214 |
| 3,146,024 | 8/1964 | Timms | 297—195 |
| 3,269,773 | 8/1966 | O'Connor | 297—214 |

FOREIGN PATENTS

| | | |
|---|---|---|
| 426,657 | 4/1935 | Great Britain. |
| 476,315 | 12/1952 | Italy. |

JAMES T. McCALL, *Primary Examiner.*